United States Patent
Inuta et al.

(10) Patent No.: US 8,457,850 B2
(45) Date of Patent: Jun. 4, 2013

(54) AUTOMATIC TRANSMISSION AND LEARNING METHOD THEREOF

(75) Inventors: Yukiyoshi Inuta, Sagamihara (JP); Hideki Oshita, Yokohama (JP); Morimasa Yamawaki, Tokyo (JP); Kazuo Tomioka, Fuji (JP); Masayuki Mannen, Fuji (JP); Tatsuya Hayashi, Fuji (JP)

(73) Assignee: Jatco Ltd, Fuji-shi (JP)

( * ) Notice: Subject to any disclaimer, the term of this patent is extended or adjusted under 35 U.S.C. 154(b) by 193 days.

(21) Appl. No.: 12/879,302

(22) Filed: Sep. 10, 2010

(65) Prior Publication Data

US 2011/0071742 A1    Mar. 24, 2011

(30) Foreign Application Priority Data

Sep. 18, 2009   (JP) ................................. 2009-216752

(51) Int. Cl.
    *G06F 7/00*      (2006.01)
    *B60W 10/02*      (2006.01)

(52) U.S. Cl.
    USPC ............... 701/68; 701/51; 701/67; 192/3.29; 477/174; 477/175; 477/169; 477/115

(58) Field of Classification Search
    USPC ............ 701/68; 192/3.29; 477/174; 475/231; 173/176
    See application file for complete search history.

(56) References Cited

U.S. PATENT DOCUMENTS

| | | | |
|---|---|---|---|
| 4,819,777 A | | 4/1989 | Yasue et al. |
| 5,125,295 A | * | 6/1992 | Iwatsuki et al. ............... 477/150 |
| 5,876,304 A | * | 3/1999 | Takiguchi ..................... 477/150 |
| 5,911,647 A | * | 6/1999 | Kozaki et al. ................. 477/143 |
| 6,139,471 A | * | 10/2000 | Tsutsui et al. ................. 477/156 |
| 6,290,626 B1 | * | 9/2001 | Noda et al. ..................... 477/169 |
| 6,503,165 B1 | * | 1/2003 | Kubo et al. .................... 475/125 |
| 7,366,601 B2 | * | 4/2008 | Ayabe et al. .................... 701/51 |
| 8,160,789 B2 | * | 4/2012 | Okazaki et al. ................. 701/54 |
| 2002/0022549 A1 | * | 2/2002 | Saito et al. .................... 477/143 |
| 2003/0036458 A1 | | 2/2003 | Tabata et al. |
| 2009/0281699 A1 | * | 11/2009 | Mayumi et al. ................. 701/66 |

FOREIGN PATENT DOCUMENTS

| | | |
|---|---|---|
| EP | 1 160 488 A2 | 12/2001 |
| JP | 05-141528 A | 6/1993 |
| JP | 06-094121 A | 4/1994 |
| JP | 11-108176 A | 4/1999 |
| JP | 2008-051152 A | 3/2008 |

* cited by examiner

*Primary Examiner* — Thomas Tarcza
*Assistant Examiner* — Tyler J Lee
(74) *Attorney, Agent, or Firm* — Foley & Lardner LLP

(57) ABSTRACT

When an inertia phase of an upshift of the transmission is started during a lockup clutch engagement operation, a following command oil pressure to be used during a following lockup clutch engagement operation is learned on the basis of a slip rotation speed, which is a rotation speed difference between an input side rotation speed of the torque converter and an output side rotation speed of the torque converter, at or after a start point of the inertia phase.

12 Claims, 9 Drawing Sheets

|  | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  | ○ | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ |  |  | ○ |  |  |  | ○ |  |
| Rev. | ○ |  |  | ○ |  |  | ○ |  |  |

FIG. 3

|  | 1st | 2nd | 3rd | 4th | 5th | 6th | 7th | Rev |
|---|---|---|---|---|---|---|---|---|
| SOL1 | ON(O) | ON(O) | ON(O) | OFF(X) | OFF(X) | OFF(X) | OFF(X) | OFF(X) |
| SOL2 | ON(X) | ON(X) | ON(X) | ON(X) | OFF(O) | OFF(O) | OFF(O) | ON(X) |
| SOL3 | ON(O) | OFF(X) | OFF(X) | OFF(X) | OFF(X) | OFF(X) | ON(O) | ON(O) |
| SOL4 | OFF(O) | OFF(O) | ON(X) | OFF(O) | OFF(O) | OFF(O) | OFF(O) | OFF(O) |
| SOL5 | OFF(X) | ON(O) | ON(O) | ON(O) | OFF(X) | ON(O) | OFF(X) | OFF(X) |
| SOL6 | ON(X) | ON(X) | OFF(O) | OFF(O) | OFF(O) | ON(X) | ON(X) | ON(X) |
| SOL7 | ON(O) | ON(O) | ON(O) | OFF(X) | OFF(X) | OFF(X) | OFF(X) | ON→OFF |

| ENGINE TORQUE | SLIP ROTATION SPEED | | | | |
|---|---|---|---|---|---|
| | 0 | 50 | 100 | 150 | 200 |
| 0 | 0 | 10 | 20 | 30 | 30 |
| 50 | -10 | 0 | 10 | 20 | 30 |
| 100 | -20 | -10 | 0 | 10 | 20 |
| 150 | -30 | -20 | -10 | 0 | 10 |
| 200 | -30 | -30 | -20 | -10 | 0 |

# AUTOMATIC TRANSMISSION AND LEARNING METHOD THEREOF

FIELD OF THE INVENTION

This invention relates to an automatic transmission, and more particularly to learning a command oil pressure relating to a lockup clutch.

BACKGROUND OF THE INVENTION

A torque converter of an automatic transmission is provided with a lockup clutch capable of directly coupling an input side and an output side, and an engagement capacity of the lockup clutch is controlled hydraulically in accordance with an operating condition of a vehicle.

A relationship between a command oil pressure for the lockup clutch and an actual engagement capacity of the lockup clutch varies with individual differences and the passage of time, and therefore the command oil pressure employed during engagement side of the lockup clutch is conventionally subjected to learning control. For example, in JP05-141528A, an excess or deficiency in the command oil pressure is learned on the basis of a decrease width of an engine rotation speed at a point where the lockup clutch acquires engagement capacity, and the next command oil pressure for the lockup clutch is corrected on the basis of this excess or deficiency.

SUMMARY OF THE INVENTION

However, in the conventional technique described above, the command oil pressure is learned on the basis of the decrease width of the engine rotation speed, and therefore the command oil pressure cannot be learned appropriately in a case where a shift operation is performed on a transmission at the same time as the lockup clutch acquires engagement capacity.

For example, when a gear position of the transmission is shifted to a high side, the engine rotation speed decreases during an inertia phase, but when the lockup clutch acquires engagement capacity during the shift, the decrease width of the engine rotation speed includes both the decrease width of the engine rotation speed generated by engagement of the lockup clutch and the decrease width of the engine rotation speed generated by the shift, and therefore the command oil pressure cannot be learned appropriately.

An object of this invention is to learn a command oil pressure for a lockup clutch appropriately in a case where a reduction in an engine rotation speed due to engagement of a lockup clutch occurs at the same time as variation in the engine rotation speed due to a shift.

An automatic transmission including a lockup clutch capable of directly coupling an input side and an output side of a torque converter interposed between a power source and a transmission, an engagement capacity of the lockup clutch being controlled in accordance with a command oil pressure, and a learning unit that, when an inertia phase of an upshift of the transmission is started during a lockup clutch engagement operation, learns a following command oil pressure to be used during a following lockup clutch engagement operation on the basis of a slip rotation speed, which is a rotation speed difference between an input side rotation speed of the torque converter and an output side rotation speed of the torque converter, at or after a start point of the inertia phase.

A learning method for an automatic transmission including a lockup clutch capable of directly coupling an input side and an output side of a torque converter interposed between a power source and a transmission, including controlling an engagement capacity of the lockup clutch in accordance with a command oil pressure, and when an inertia phase of an upshift of the transmission is started during a lockup clutch engagement operation, learning a following command oil pressure to be used during a following lockup clutch engagement operation on the basis of a slip rotation speed, which is a rotation speed difference between an input side rotation speed of the torque converter and an output side rotation speed of the torque converter, at or after a start point of the inertia phase.

Embodiments and advantages of this invention will be described in detail below with reference to the attached figures.

BRIEF DESCRIPTION OF THE DRAWINGS

FIG. 3 is a view illustrating engagement operation states of friction elements for realizing respective gear positions of the automatic transmission.

FIG. 4 is a view illustrating solenoid valve operation states corresponding to the operation states of the respective friction elements of the automatic transmission.

FIG. 7 is a correction amount map used during learning of a command oil pressure.

DESCRIPTION OF THE PREFERRED EMBODIMENTS

Figure 1:
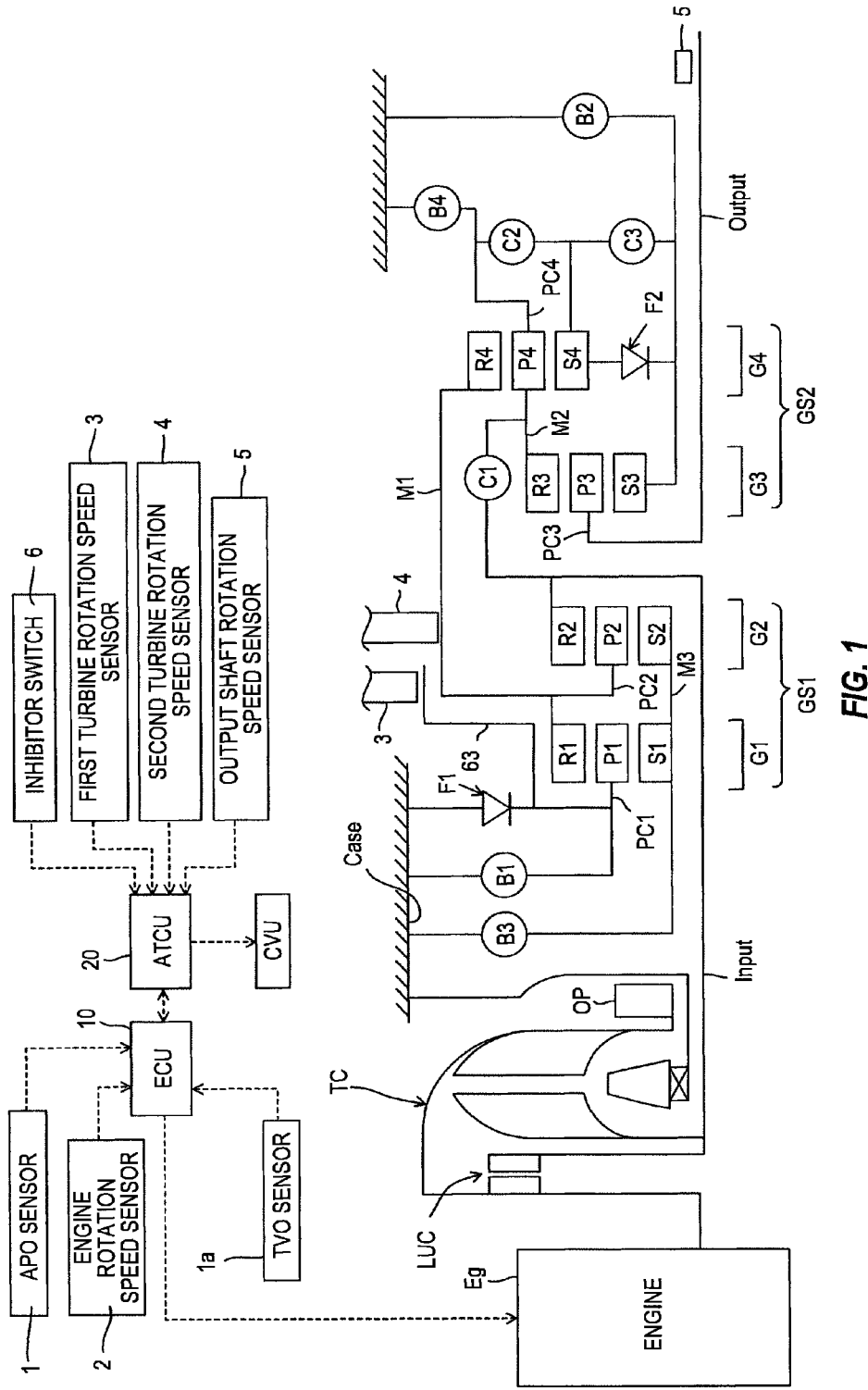
FIG. 1 is a skeleton diagram and a system diagram showing an example of the constitution of an automatic transmission.

FIG. 1 is a skeleton diagram and a system diagram showing an example of the constitution of an automatic transmission.

The automatic transmission according to this embodiment is an automobile transmission having seven forward gear positions and one reverse gear position, which is connected to an engine Eg of a vehicle via a torque converter TC including a lockup clutch LUC. Rotation output from the engine Eg is transmitted to a pump impeller and an oil pump OP of the torque converter TC, whereupon oil agitated by rotation of the pump impeller is transmitted to a turbine runner via a stator. As a result, an input shaft Input is driven.

The vehicle, not shown in the drawing, is further provided with an engine controller (ECU) 10 that controls a driving condition of the engine Eg, an automatic transmission controller (ATCU) 20 that controls a shift condition and so on of the automatic transmission, and a control valve unit CVU that executes hydraulic control on respective friction elements on the basis of output signals from the ATCU 20. The ECU 10 and the ATCU 20 are connected via a CAN communication line or the like so as to share sensor information and control information with each other through communication.

An APO sensor 1 that detects an accelerator pedal operation amount APO generated by a driver, a TVO sensor 1a that detects a throttle opening TVO of the engine Eg, and an engine rotation speed sensor 2 that detects an engine rotation speed are connected to the ECU 10. On the basis of the engine rotation speed and the accelerator operation amount, the ECU 10 controls a fuel injection amount and the throttle opening, whereby the engine rotation speed and an engine torque are controlled.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of an output shaft Output, and an inhibitor switch 6 that detects a shift lever operation condition generated by the driver, all of which will be described below, are connected to the ATCU 20. The shift lever includes, in addition to P, R, N and D positions, an engine brake range position in which an engine brake is operative and a normal forward travel range position in which the engine brake is inoperative.

The ATCU 20 includes a rotation speed calculation unit that calculates a rotation speed of the input shaft Input. During a normal operation, the ATCU 20 sets an optimum target gear position from a shift map of the seven forward speeds, to be described below, on the basis of a vehicle speed Vsp and either the throttle opening TVO or the accelerator pedal opening APO, and outputs a control command to the control valve unit CVU to realize the target gear position.

[Constitution of Automatic Transmission]

Next, the constitution of the automatic transmission will be described. Planetary gear mechanisms are disposed in an axial direction from the input shaft Input side to the output shaft Output side in order of a first planetary gear set GS1 and a second planetary gear set GS2. Further, a plurality of clutches C1, C2, C3, a plurality of brakes B1, B2, B3, B4, and a plurality of one-way clutches F1, F2 are provided as friction elements.

The first planetary gear set GS1 includes two planetary gears G1, G2. The first planetary gear G1 is a single pinion planetary gear comprising a first sun gear S1, a first ring gear R1, a first pinion P1 meshed to the two gears S1, R1, and a first carrier PC1 that supports the first pinion P1 rotationally.

The second planetary gear G2 is also a single pinion planetary gear and comprises a second sun gear S2, a second ring gear R2, a second pinion P2 meshed to the two gears S2, R2, and a second carrier PC2 that supports the second pinion P2 rotationally.

The second planetary gear set GS2 includes two planetary gears G3, G4. The third planetary gear G3 is a single pinion planetary gear comprising a third sun gear S3, a third ring gear R3, a third pinion P3 meshed to the two gears S3, R3, and a third carrier PC3 that supports the third pinion P3 rotationally.

The fourth planetary gear G4, similarly to the first to third gear sets, is a single pinion planetary gear comprising a fourth sun gear S4, a fourth ring gear R4, a fourth pinion P4 meshed to the two gears S4, R4, and a fourth carrier PC4 that supports the fourth pinion P4 rotationally.

The input shaft Input is connected to the second ring gear R2 such that a driving force from the engine Eg is input into the second ring gear R2 via the torque converter TC and so on.

The output shaft Output, on the other hand, is connected to the third carrier PC3 such that an output driving force is transmitted to a drive wheel via a final gear, not shown in the drawing, and so on.

The first ring gear R1, second carrier PC2, and fourth ring gear R4 are connected integrally by a first connecting member M1. The third ring gear R3 and the fourth carrier PC4 are connected integrally by a second connecting member M2, and the second connecting member M2 is connected to the input shaft Input and the second ring gear R2 via the clutch C1.

The first sun gear S1 and the second sun gear S2 are connected integrally by a third connecting member M3.

Hence, in the first planetary gear set GS1, the first planetary gear G1 and second planetary gear G2 are connected by the first connecting member M1 and the third connecting member M3, and therefore the first planetary gear set GS1 is constituted by four rotary elements. In the second planetary gear set GS2, the third planetary gear G3 and fourth planetary gear G4 are connected by the second connecting member M2, and therefore the second planetary gear set GS2 is constituted by five rotary elements.

The first planetary gear set GS1 includes a torque input path for torque input into the second ring gear R2 from the input shaft Input, and the torque input into the first planetary gear set GS1 is output to the second planetary gear set GS2 from the first connecting member M1.

The second planetary gear set GS2 includes a torque input path for torque input into the second connecting member M2 from the input shaft Input and a torque input path for torque input into the fourth ring gear R4 from the first connecting member M1, and the torque input into the second planetary gear set GS2 is output to the output shaft Output from the third carrier PC3.

Of the clutches C1 to C3, an input clutch C1 selectively connects and disconnects the input shaft Input and the second connecting member M2, while a direct clutch C2 selectively connects and disconnects the fourth sun gear S4 and the fourth carrier PC4.

An H&LR clutch C3 selectively connects and disconnects the third sun gear S3 and the fourth sun gear S4. A second one-way clutch F2 is disposed between the third sun gear S3 and the fourth sun gear S4. The second one-way clutch F2 permits relative rotation between the third sun gear S3 and the fourth sun gear S4 in only one direction and rotates integrally therewith in an opposite direction.

When the H&LR clutch C3 is disengaged and the rotation speed of the fourth sun gear S4 is larger than that of the third sun gear S3, the third sun gear S3 and the fourth sun gear S4 generate independent rotation speeds. Therefore, the third planetary gear G3 and fourth planetary gear G4 are connected via the second connecting member M2 such that the respective planetary gears realize independent gear ratios.

Of the brakes B1 to B4, a front brake B1 selectively halts rotation of the first carrier PC1. A first one-way clutch F1 is disposed parallel to the front brake B1.

A low brake B2 selectively halts rotation of the third sun gear S3. A 2346 brake B3 selectively halts rotation of the third connecting member M3 (the first sun gear S1 and second sun gear S2). A reverse brake B4 selectively halts rotation of the fourth carrier PC4.

[Turbine Rotation Speed Calculation]

The input shaft Input is connected to the second ring gear R2, and the first planetary gear G1 and second planetary gear G2 constitute the first planetary gear set GS1 in which two rotary elements are connected. Therefore, the rotation speed calculation unit provided in the ATCU 20 detects the rotation speed of the input shaft Input through calculation using the two turbine rotation speed sensors 3, 4.

The first turbine rotation speed sensor 3 detects the rotation speed of a sensor member 63 serving as a turbine sensor member connected to the first carrier PC1. The second turbine rotation speed sensor 4 detects the rotation speed of the second carrier PC2.

When the rotation speed of the first carrier PC1 is denoted by N (PC1), the rotation speed of the second carrier PC2 is denoted by N (PC2), the rotation speed of the second ring gear R2 is denoted by N (R2), a gear ratio between the second ring gear R2 and the second carrier PC2 (first ring gear R1) is denoted by 1, and a gear ratio between the first ring gear R1 (second carrier PC2) and the first carrier PC1 is denoted by β, the rotation speed N (R2) of the second ring gear R2 can be calculated using a following equation.

$$N(R2)=(1+1/\beta)\cdot N(PC2)-(1/\beta)\cdot N(PC1)$$

Hence, rotation speed of second ring gear R2 (input shaft Input)=turbine rotation speed can be determined.

[Constitution of Control Valve Unit]

Next, a hydraulic circuit of the control valve unit CVU will be described using FIG. 2. The hydraulic circuit is provided with the oil pump OP, which serves as an oil pressure source driven by the engine Eg, a manual valve MV that operates in conjunction with a shift lever operation by the driver to switch an oil passage along which a line pressure PL is supplied, and a pilot valve PV that reduces the line pressure to a predetermined fixed pressure.

The hydraulic circuit is also provided with a first pressure regulating valve CV1 that regulates an engagement pressure of the low brake B2, a second pressure regulating valve CV2 that regulates an engagement pressure of the input clutch C1, a third pressure regulating valve CV3 that regulates an engagement pressure of the front brake B1, a fourth pressure regulating valve CV4 that regulates an engagement pressure of the H&LR clutch C3, a fifth pressure regulating valve CV5 that regulates an engagement pressure of the 2346 brake B3, and a sixth pressure regulating valve CV6 that regulates an engagement pressure of the direct clutch C2.

The hydraulic circuit is further provided with a first switch valve SV1 that switches one of respective oil supply passages 150a, 150b of the low brake B2 and the input clutch C1 to a communicative condition, a second switch valve SV2 that switches one of respective oil supply passages for supplying a D range pressure $P_D$ and an R range pressure $P_R$ to the direct clutch C2 to a communicative condition, a third switch valve SV3 that switches an oil pressure supplied to the reverse brake B4 between an oil pressure supplied from the sixth pressure regulating valve CV6 and an oil pressure supplied from the R range pressure, and a fourth switch valve SV4 that switches an oil pressure output by the sixth pressure regulating valve CV6 between an oil passage 123 and an oil passage 122.

The hydraulic circuit is further provided with a first solenoid valve SOL1 that outputs a pressure control signal to the first pressure regulating valve CV1, a second solenoid valve SOL2 that outputs a pressure control signal to the second pressure regulating valve CV2, a third solenoid valve SOL3 that outputs a pressure control signal to the third pressure regulating valve CV3, a fourth solenoid valve SOL4 that outputs a pressure control signal to the fourth pressure regulating valve CV4, a fifth solenoid valve SOL5 that outputs a pressure control signal to the fifth pressure regulating valve CV5, a sixth solenoid valve SOL6 that outputs a pressure control signal to the sixth pressure regulating valve CV6, and a seventh solenoid valve SOL1 that outputs a switch signal to the first switch valve SV1 and the third switch valve SV3, on the basis of control signals from the automatic transmission control unit 20.

The solenoid valves SOL2, SOL5, SOL6 are respectively constituted by three-way proportioning solenoid valves having three ports, wherein a pilot pressure to be described below is led to a first port, a second port is connected to a drain oil passage, and a third port is connected to a pressure receiving portion of either a pressure regulating valve or a switch valve. The solenoid valves SOL1, SOL3, SOL4 are respectively constituted by two-way proportioning solenoid valves having two ports, and the solenoid valve SOL7 is a three-way ON/OFF solenoid valve having three ports.

The first solenoid valve SOL1, third solenoid valve SOL3, and seventh solenoid valve SOL7 are normally closed (closed when not energized) solenoid valves. The second solenoid valve SOL2, fourth solenoid valve SOL4, fifth solenoid valve SOL5, and sixth solenoid valve SOLE, on the other hand, are normally open (open when not energized) solenoid valves.

[Oil Passage Configuration]

Pressure discharged by the oil pump OP when driven by the engine Eg is regulated to a line pressure and then supplied to an oil passage 101 and an oil passage 102. An oil passage 101a connected to the manual valve MV, which is activated in conjunction with a shift lever operation by the driver, an oil passage 101b that supplies a source pressure of the engagement pressure of the front brake B1, and an oil passage 101c that supplies a source pressure of the engagement pressure of the H&LR clutch C3 are connected to the oil passage 101.

An oil passage 105 and an oil passage 106 that supplies the R range pressure, which is selected during reverse travel, are connected to the manual valve MV, and the manual valve MV switches between the oil passage 105 and the oil passage 106 in accordance with a shift lever operation.

An oil passage 105a that supplies a source pressure of the engagement pressure of the low brake B2, an oil passage 105b that supplies a source pressure of the engagement pressure of the input clutch C1, an oil passage 105c that supplies a source pressure of the engagement pressure of the 2346 brake B3, an oil passage 105d that supplies a source pressure of the engagement pressure of the direct clutch C2, and an oil passage 105e that supplies a switch pressure of the second switch valve SV2, to be described below, are connected to the oil passage 105.

An oil passage 106a that supplies the switch pressure of the second switch valve SV2, an oil passage 106b that supplies the source pressure of the engagement pressure of the direct clutch C2, and an oil passage 106c that supplies the engagement pressure of the reverse brake B4 are connected to the oil passage 106.

An oil passage 103 that supplies the pilot pressure via the pilot valve PV is connected to the oil passage 102. The oil passage 103 is provided with an oil passage 103a that supplies the pilot pressure to the first solenoid valve SOL1, an oil passage 103b that supplies the pilot pressure to the second solenoid valve SOL2, an oil passage 103c that supplies the pilot pressure to the third solenoid valve SOL3, an oil passage 103d that supplies the pilot pressure to the fourth solenoid valve SOL4, an oil passage 103e that supplies the pilot pressure to the fifth solenoid valve SOL5, an oil passage 103f that supplies the pilot pressure to the sixth solenoid valve SOL6, and an oil passage 103g that supplies the pilot pressure to the seventh solenoid valve SOL1.

By constituting the hydraulic circuit in this manner and controlling the respective solenoid valves, the respective friction elements C1 to C3, B1 to B4 can be switched between engagement and disengagement.

As shown by an engagement operation table in FIG. 3, by combining engagement marked by circles (O) and disengagement (unmarked) of the respective clutches C1 to C3 and brakes B1 to B4 appropriately, the respective gear positions of the seven forward speeds and the one reverse speed can be realized.

[Shift Operations]

Next, shift operations will be described.

(First speed)

In the first speed, different friction elements are operated depending on whether the engine brake is operative (an engine brake range position has been selected) or inoperative (a notmal forward travel range position has been selected). As shown by the (O) marks in FIG. 3, when the engine brake is operative, the front brake B1, the low brake B2, and the H&LR clutch C3 are engaged. The first one-way clutch F1 provided parallel to the front brake B1 and the second one-way clutch F2 provided parallel to the H&LR clutch C3 also contribute to torque transmission. When the engine brake is inoperative, the front brake B1 and the H&LR clutch C3 are disengaged such that only the low brake B2 is engaged, and torque is transmitted by the first one-way clutch F1 and second one-way clutch F2.

In the first speed, the front brake B1 is engaged (engaged by the first one-way clutch F1 when the engine brake is inoperative), and therefore rotation input into the second ring gear R2 from the input shaft Input is reduced by the first planetary gear set GS1. This reduced rotation is output to the fourth ring gear R4 from the first connecting member M1. Further, the low brake B2 and the H&LR clutch C3 are engaged (engaged by the low brake B2 and the second one-way clutch F2 when the engine brake is inoperative), and therefore rotation input into the fourth ring gear R4 is reduced by the second planetary gear set and output from the third carrier PC3.

In the first speed, torque acts on the front brake B1 (or the first one-way clutch F1), the low brake B2, the H&LR clutch C3 (or the second one-way clutch F2), the first connecting member M1, the second connecting member M2, and the third connecting member M3. In other words, the first planetary gear set GS1 and second planetary gear set GS2 contribute to torque transmission.

At this time, as shown by a solenoid valve operation table in FIG. 4, engagement pressure is supplied to the desired friction elements by switching the first to third solenoid valves SOL1 to SOL3 and the sixth and seventh solenoid valves SOL6, SOL7 ON and switching the other solenoid valves OFF.

Figure 2:
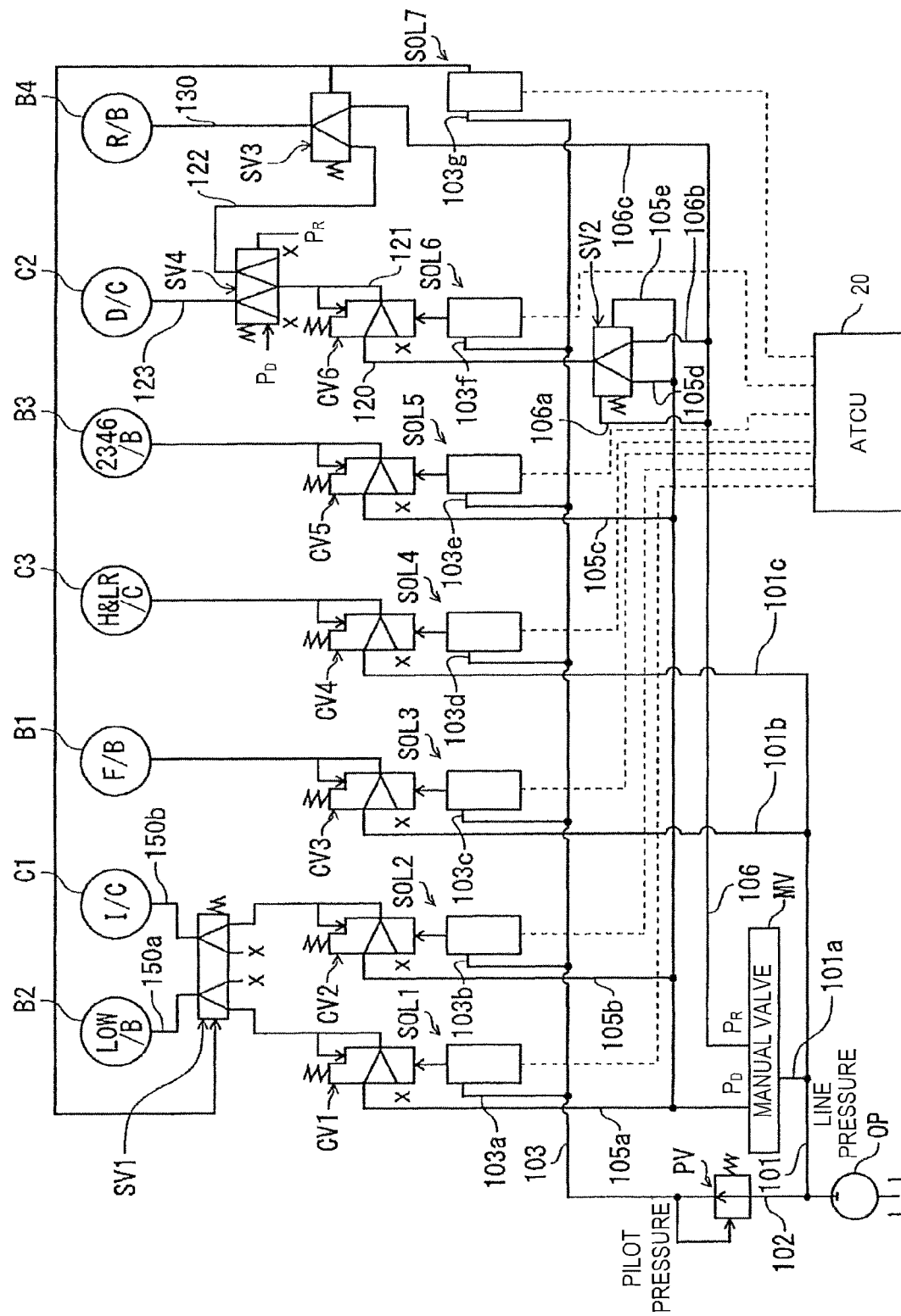
FIG. 2 is a circuit diagram showing an example of a hydraulic circuit provided in a control valve unit of the automatic transmission.

Further, since the seventh solenoid valve SOL7 is ON, the first switch valve SV1 moves to the left of FIG. 2 such that the first pressure regulating valve CV1 communicates with the low brake B2 and the input clutch C1 is connected to a drain (an interlocking condition is prevented). Furthermore, since the D range pressure $P_D$ is exerted on a fourth port c4, the second switch valve SV2 moves to the left in FIG. 2 such that a first port c1 communicates with a third port c3, and therefore the D range pressure $P_D$ acts on the sixth pressure regulating valve CV6. The sixth pressure regulating valve CV6 moves downward in FIG. 2, and therefore the D range pressure $P_D$ is not supplied to the direct clutch C2 and the fourth switch valve SV4.

It should be noted that the D range pressure $P_D$ causes the fourth switch valve SV4 to move to the right of FIG. 2 such that the oil passage 121 communicates with the oil passage 123, but this bears no relation to the engagement operation. Further, a signal pressure is supplied to a port d4 from the seventh solenoid valve SOL7, and therefore the third switch valve SV3 moves to the left in FIG. 2 such that a first port d1 communicates with a third port d3, but since no oil pressure is supplied to the oil passage 122, no oil pressure is supplied to the reverse brake B4.

(Second Speed)

In the second speed, different friction elements are engaged depending on whether the engine brake is operative (the engine brake range position has been selected) or inoperative (the normal forward travel range position has been selected). As shown by the (O) marks in FIG. 3, when the engine brake is operative, the low brake B2, the 2346 brake B3, and the H&LR clutch C3 are engaged. The second one-way clutch F2 provided parallel to the H&LR clutch C3 also contributes to torque transmission. When the engine brake is inoperative, the H&LR clutch C3 is disengaged and the low brake B2 and 2346 brake B3 are engaged, and torque is transmitted by the second one-way clutch F2.

In the second speed, the 2346 brake B3 is engaged, and therefore the rotation input into the second ring gear R2 from the input shaft Input is reduced by the second planetary gear G2 alone. This reduced rotation is output to the fourth ring gear R4 from the first connecting member M1. The low brake B2 and the H&LR clutch C3 are engaged (engaged by the second one-way clutch F2 when the engine brake is inoperative), and therefore the rotation input into the fourth ring gear R4 is reduced by the second planetary gear set and output from the third carrier PC3.

In the second speed, torque acts on the 2346 brake B3, the low brake B2, the H&LR clutch C3 (or the second one-way clutch F2), the first connecting member M1, the second connecting member M2, and the third connecting member M3. In other words, the second planetary gear G2 and the second planetary gear set GS2 contribute to torque transmission.

During an upshift from the first speed to the second speed, the first one-way clutch F1 is disengaged at a point where an engagement capacity of the 2346 brake B3 is secured by disengaging the front brake B1 slightly early and then starting to engage the 2346 brake B3. In so doing, an improvement in shift timing precision can be achieved.

At this time, as shown by the solenoid valve operation table in FIG. 4, engagement pressure is supplied to the desired friction elements by switching the first, second, and fifth to seventh solenoid valves SOL1, SOL2, SOL5, SOL6, SOL7 ON and switching the other solenoid valves OFF.

(Third Speed)

As shown in FIG. 3, the third speed is obtained by engaging the 2346 brake B3, the low brake B2, and the direct clutch C2.

In the third speed, the 2346 brake B3 is engaged, and therefore the rotation input into the second ring gear R2 from the input shaft Input is reduced by the second planetary gear G2. This reduced rotation is output to the fourth ring gear R4 from the first connecting member M1. Further, the direct clutch C2 is engaged, and therefore the fourth planetary gear G4 rotates integrally. The low brake B2 is also engaged, and therefore rotation input into the third ring gear R3 from the fourth carrier PC4, which rotates integrally with the fourth ring gear R4, via the second connecting member M2 is reduced by the third planetary gear G3 and output from the third carrier PC3. Hence, the fourth planetary gear G4 contributes to torque transmission but does not contribute to the reduction operation.

In other words, the third speed is defined by a line linking an engagement point of the 2346 brake B3 that reduces the rotation output from the engine and an engagement point of the low brake B2 that reduces the reduced rotation from the second planetary gear G2, and therefore the rotation input from the input shaft Input is reduced and output from the output shaft Output.

In the third speed, torque acts on the 2346 brake B3, the low brake B2, the direct clutch C2, the first connecting member M1, the second connecting member M2, and the third connecting member M3. In other words, the second planetary gear G2 and the second planetary gear set GS2 contribute to torque transmission.

During an upshift from the second speed to the third speed, the second one-way clutch F2 is disengaged at a point where an engagement capacity of the direct clutch C2 is secured by disengaging the H&LR clutch C3 slightly early and then starting to engage the direct clutch C2. In so doing, an improvement in shift timing precision can be achieved.

At this time, as shown by the solenoid valve operation table in FIG. 4, engagement pressure is supplied to the desired friction elements by switching the first, second, fourth, fifth and seventh solenoid valves SOL1, SOL2, SOL4, SOL5, SOL7 ON and switching the other solenoid valves OFF.

(Fourth Speed)

As shown in FIG. 3, the fourth speed is obtained by engaging the 2346 brake B3, the direct clutch C2, and the H&LR clutch C3.

In the fourth speed, the 2346 brake B3 is engaged, and therefore the rotation input into the second ring gear R2 from the input shaft Input is reduced by the second planetary gear G2 alone. This reduced rotation is output to the fourth ring gear R4 from the first connecting member M1. The direct clutch C2 and the H&LR clutch C3 are engaged, and therefore the second planetary gear set GS2 rotates integrally. Hence, the rotation input into the fourth ring gear R4 is output from the third carrier PC3 as is.

In the fourth speed, torque acts on the 2346 brake B3, the direct clutch C2, the H&LR clutch C3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired friction elements by switching the second and fifth solenoid valves SOL2, SOL5 ON and switching the other solenoid valves OFF.

Further, since the seventh solenoid valve SOL7 is OFF, the first switch valve SV1 moves to the right of FIG. 2 at this time such that the low brake B2 communicates with a drain circuit and the second pressure regulating valve CV2 communicates with the input clutch C1 (an interlocking condition is prevented). Furthermore, since the D range pressure $P_D$ is exerted on the fourth port c4, the second switch valve SV2 moves to the left in FIG. 2 such that the first port c1 communicates with the third port c3. The sixth pressure regulating valve CV6 moves upward in FIG. 2, and therefore regulated oil pressure is supplied to the fourth switch valve SV4.

The D range pressure $P_D$ acts on the fourth switch valve SV4, and therefore the oil passage 121 communicates with the oil passage 123. The oil passage 122 communicates with the drain circuit, and therefore oil pressure is supplied to the direct clutch C2 but not supplied to the third switch valve SV3. The signal pressure is not supplied to the port d4 from the seventh solenoid valve SOL1, and therefore the third switch valve SV3 moves to the right in FIG. 2. As a result, the second port d2 communicates with the third port d3 but the R range pressure is not supplied to the oil passage 106c (the R range pressure is blocked by the manual valve MV), and therefore no oil pressure is supplied to the reverse brake B4.

(Fifth Speed)

As shown in FIG. 3, the fifth speed is obtained by engaging the input clutch C1, the direct clutch C2, and the H&LR clutch C3.

In the fifth speed, the input clutch C1 is engaged, and therefore the rotation of the input shaft Input is input into the second connecting member M2. Further, the direct clutch C2 and the H&LR clutch C3 are engaged, and therefore the third planetary gear G3 rotates integrally. Hence, the rotation of the input shaft Input is output from the third carrier PC3 as is.

In the fifth speed, torque acts on the input clutch C1, the direct clutch C2, the H&LR clutch C3, and the second connecting member M2. In other words, only the third planetary gear G3 contributes to torque transmission.

At this time, as shown by the solenoid valve operation table in FIG. 4, engagement pressure is supplied to the desired friction elements by switching all of the solenoid valves SOL1 to SOL7 OFF.

(Sixth Speed)

As shown in FIG. 3, the sixth speed is obtained by engaging the input clutch C1, the H&LR clutch C3, and the 2346 brake B3.

In the sixth speed, the input clutch C1 is engaged, and therefore the rotation of the input shaft Input is input into the second ring gear and the second connecting member M2. Further, the 2346 brake B3 is engaged, and therefore the rotation reduced by the second planetary gear G2 is output to the fourth ring gear R4 from the first connecting member M1. The H&LR clutch C3 is also engaged, and therefore the second planetary gear set GS2 outputs rotation defined by the rotation of the fourth ring gear R4 and the rotation of the second connecting member M2 from the third carrier PC3.

In the sixth speed, torque acts on the input clutch C1, the H&LR clutch C3, the 2346 brake B3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired friction elements by switching the fifth and sixth solenoid valves SOL5, SOL6 ON and switching the other solenoid valves SOL1, SOL2, SOL3, SOL4, SOL7 OFF.

(Seventh Speed)

As shown in FIG. 3, the seventh speed is obtained by engaging the input clutch C1, the H&LR clutch C3, and the front brake B1 (the one-way clutch F1).

In the seventh speed, the input clutch C1 is engaged, and therefore the rotation of the input shaft Input is input into the second ring gear and the second connecting member M2. Further, the front brake B1 is engaged, and therefore the rotation reduced by the first planetary gear set GS1 is output to the fourth ring gear R4 from the first connecting member M1. The H&LR clutch C3 is also engaged, and therefore the second planetary gear set GS2 outputs rotation defined by the rotation of the fourth ring gear R4 and the rotation of the second connecting member M2 from the third carrier PC3.

In the seventh speed, torque acts on the input clutch C1, the H&LR clutch C3, the front brake B1, the first connecting member M1, the second connecting member M2, and the third connecting member M3. In other words, the first planetary gear set GS1 and the second planetary gear set GS2 contribute to torque transmission.

At this time, as shown by the solenoid valve operation table in FIG. 4, engagement pressure is supplied to the desired friction elements by switching the third and sixth solenoid valves SOL3, SOL6 ON and switching the other solenoid valves SOL1, SOL2, SOL4, SOL5, SOL7 OFF.

(Reverse)

As shown in FIG. 3, reverse is obtained by engaging the H&LR clutch C3, the front brake B1, and the reverse brake B4.

In reverse, the front brake B1 is engaged, and therefore the rotation reduced by the first planetary gear set GS1 is output to the fourth ring gear R4 from the first connecting member M1. The H&LR clutch C3 and the reverse brake B4 are also engaged, and therefore the second planetary gear set GS2 outputs rotation defined by the rotation of the fourth ring gear R4 and by fixing the second connecting member M2 from the third carrier PC3.

In other words, reverse is defined by a line linking respective engagement points of the front brake B1 that reduces the rotation output from the engine via the first planetary gear set GS1, the reverse brake B4 that fixes the rotation of the second connecting member M2, and the H&LR clutch C3 forming the second planetary gear set GS2, and therefore the rotation input from the input shaft Input is reduced in an opposite direction and output from the output gear Output.

As regards the torque flow in reverse, torque acts on the H&LR clutch C3, the front brake B1, the reverse brake B4, the first connecting member M1, the second connecting member M2, and the third connecting member M3. In other words, the first planetary gear set GS1 and second planetary gear set GS2 contribute to torque transmission.

At this time, as shown by the solenoid valve operation table in FIG. 4, engagement pressure is supplied to the desired friction elements by switching the second, third and sixth solenoid valves SOL2, SOL3, SOL6 ON and switching the other solenoid valves SOL1, SOL4, SOL5, SOL7 OFF. The seventh solenoid valve SOL7 is switched ON at the beginning of an R range switch and switched OFF following engagement completion.

The R range pressure is supplied to the reverse brake B4 via the third switch valve SV3. The R range does not have a dedicated pressure regulating valve, and therefore, at the beginning of engagement, the sixth pressure regulating valve CV6 used in the direct clutch C2 is employed to regulate the engagement pressure of the reverse brake B4. When the manual valve MV initially switches to the R range pressure $P_R$, the second switch valve SV2 moves to the right in FIG. 2 such that the R range pressure $P_R$ is supplied to the sixth pressure regulating valve CV6. Further, the fourth switch valve SV4 moves to the left in FIG. 2 such that the oil passage 121 communicates with the oil passage 122. As a result, oil pressure regulated by the sixth pressure regulating valve CV6 is led into the oil passage 122.

When the seventh solenoid valve SOL7 is switched ON in this state, the third switch valve SV3 moves to the left in FIG. 2 such that the oil passage 122 communicates with an oil passage 130. Hence, while the seventh solenoid valve SOL7 remains ON, the engagement pressure of the reverse brake B4 is controlled by oil pressure regulated by the sixth pressure regulating valve CV6. When engagement is complete, the seventh solenoid valve SOL7 is switched OFF. Accordingly, the third switch valve SV3 moves to the right in FIG. 2 such that the oil passage 106c communicates with the oil passage 130, and as a result, the R range pressure $P_R$ is introduced as is, whereby the engaged condition is maintained.

Hence, by providing the third switch valve SV3 and the fourth switch valve SV4, the engagement pressures of two friction elements can be controlled using a single pressure regulating valve.

Figure 5:
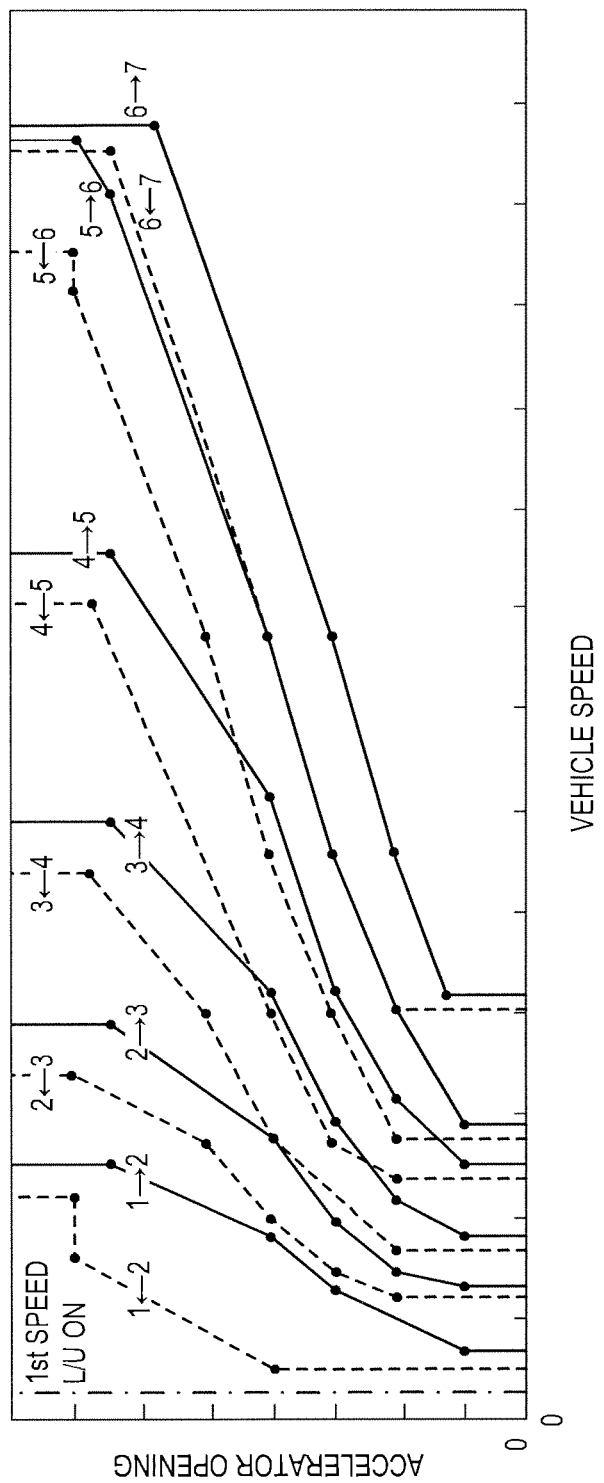
FIG. 5 is a view showing a shift map provided in a control device for the automatic transmission.

The seven speed shift map has the characteristics shown in FIG. 5, for example, wherein shift regions are defined using the vehicle speed calculated on the basis of the output shaft rotation speed sensor 5 and the accelerator opening APO obtained by the accelerator opening sensor 1 as parameters and an upshift or a downshift is executed when an upshift line or a downshift line is crossed.

A shift operation for an upshift or a downshift is constituted by four phases, namely a preparatory phase, a torque phase, an inertia phase, and a final phase. In the preparatory phase, oil pressure is precharged to a friction element to be engaged, whereby the friction element to be engaged is held in a condition immediately prior to engagement. In the torque phase, oil pressure supplied to a friction element to be disengaged is reduced and the oil pressure supplied to the friction element to be engaged is increased, whereby the friction element that receives torque transmission is shifted from the friction element to be disengaged to the friction element to be engaged. In the inertia phase, a speed ratio is varied from the speed ratio of a pre-shift gear position to the speed ratio of a post-shift gear position. In the final phase, the friction element to be disengaged is fully disengaged by setting the oil pressure supplied to the friction element to be disengaged at zero, and the friction element to be engaged is fully engaged by increasing the oil pressure supplied to the friction element to be engaged.

It should be noted that the order of the torque phase and the inertia phase differs depending on the shift type (an upshift or a downshift) and a drive condition (a driving condition or a coasting condition).

Further, on the shift map in FIG. 5, a first speed lockup ON line is indicated by a dot-dash line, and in order to establish a lockup condition from a lower vehicle speed in response to recent demand for improved fuel efficiency, the first speed lockup ON line is provided close to a 1→2 upshift line. When an operating condition defined by the vehicle speed and the accelerator opening crosses the first speed lockup ON line from left to right while the vehicle travels in the first speed, an engagement command is output to the lockup clutch LUC.

Here, a relationship between a command oil pressure for the lockup clutch LUC and an actual engagement capacity of the lockup clutch LUC varies with individual differences and the passage of time, and therefore the command oil pressure must be learned every time the lockup clutch LUC is engaged. For this purpose, the command oil pressure is conventionally corrected on the basis of a decrease width of the engine rotation speed following the start of engagement of the lockup clutch LUC such that when the decrease width is larger than a target value, the command oil pressure is determined to be too high, and when the decrease width is smaller than the target value, the command oil pressure is determined to be too low.

The command oil pressure is also corrected on the basis of a deviation between an engagement completion time of the lockup clutch LUC and a target completion time such that when the engagement completion time deviates to an early side of the target completion time, the command oil pressure is determined to be too high, and when the engagement completion time deviates to a late side of the target completion time, the command oil pressure is determined to be too low.

However, in an automatic transmission in which the first speed lockup ON line is provided close to the 1→2 upshift line, an engagement operation may occur in the lockup clutch LUC at the same time as the inertia phase of a 1→2 upshift, and in this case, the engine decrease width includes both a decrease generated by engagement of the lockup clutch LUC and variation generated by the upshift. Therefore, the decrease width of the engine rotation speed generated only when the lockup clutch LUC acquires engagement capacity cannot be detected. Hence, in cases such as that described above, the command oil pressure for the lockup clutch LUC cannot be learned appropriately on the basis of the decrease width of the engine rotation speed.

Furthermore, in cases such as that described above, the engagement completion time of the lockup clutch LUC cannot be determined on the basis of the decrease in the engine rotation speed, and therefore the deviation between the engagement completion time and the target completion time cannot be grasped accurately. As a result, the command oil pressure for the lockup clutch LUC cannot be learned on the basis of the deviation in the engagement completion time of the lockup clutch LUC.

Figure 6:
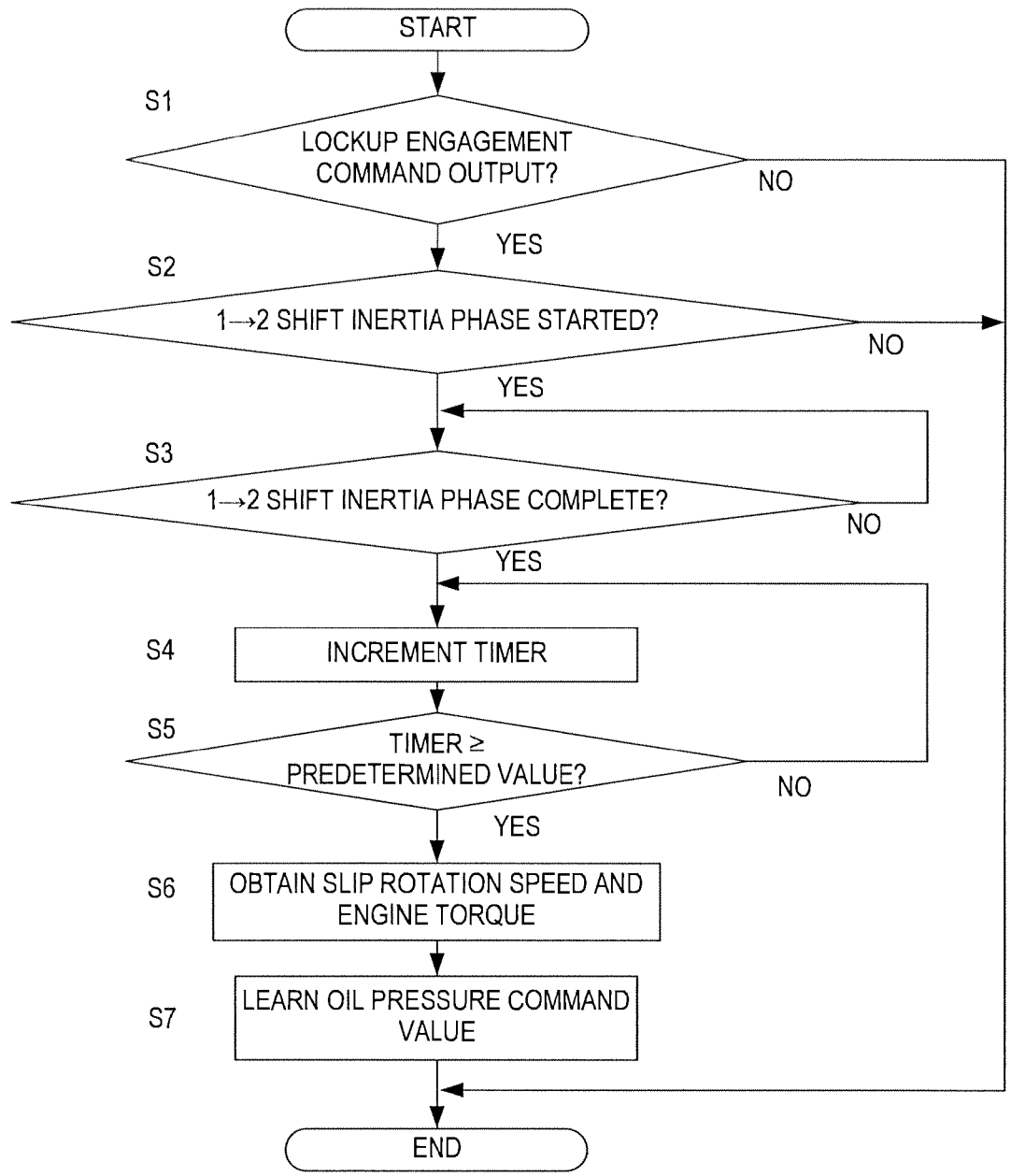
FIG. 6 is a flowchart showing control executed by the control device for the automatic transmission.

Hence, in this embodiment, the following control is performed to learn the command oil pressure of the lockup clutch LUC. FIG. 6 is a flowchart showing control executed by the control device for the automatic transmission.

In a step S1, a determination is made as to whether or not an engagement command has been output in relation to the lockup clutch LUC. When it is determined that a lockup engagement command has been output, the routine advances to a step S2, and when a lockup engagement command has not been output, the processing is terminated. When the operating condition defined by the vehicle speed and the accelerator opening on the shift map of FIG. 5 crosses the first speed lockup ON line to the right side, it is determined that a lockup engagement command has been output.

In the step S2, a determination is made as to whether or not the inertia phase of a 1→2 shift has begun. When it is determined that the inertia phase of the 1→2 shift has begun, the routine advances to a step S3, and when the 1→2 shift has not begun, the processing is terminated. The determination as to whether or not the inertia phase of the 1→2 shift has begun is made by determining whether or not a speed ratio, which is a rotation speed ratio between the input shaft Input and the output shaft Output has fallen below a speed ratio corresponding to the first speed.

In the step S3, a determination is made as to whether or not the inertia phase of the 1→2 shift is complete. When it is determined that the inertia phase is complete, the routine advances to a step S4, and when the inertia phase is not complete, the step is repeated. The determination as to whether or not the inertia phase of the 1→2 shift is complete is made by determining whether or not the speed ratio has reached a speed ratio corresponding to the second speed.

In the step S4, a timer is incremented. An elapsed time from completion of the inertia phase of the 1→2 shift is thus measured.

In a step S5, a determination is made as to whether or not the timer is equal to or greater than a predetermined value. When it is determined that the timer is equal to or greater than the predetermined value, the routine advances to a step S6, and when the timer is determined to be smaller than the predetermined value, the routine returns to the step S4, where the timer is incremented again. The predetermined value is set at approximately 0.3 to 0.4 seconds, for example. The reason for setting the predetermined value thus is as follows.

When a shift is underway, torque reduction control is performed during the inertia phase (between t2 and t3) to prevent thrust shock, and simultaneously with the end of the inertia phase, torque restoration control is performed to return from the torque reduction control. When torque reduction control and torque restoration control are performed in this manner, the engine rotation speed at the end of the inertia phase may decrease. The reason for this is that when the engine torque is restored, a slight time lag occurs from the start of the torque restoration control, and therefore the engine torque is not restored at the end of the inertia phase. Hence, by setting the predetermined value at a time required for variation in the engine rotation speed caused by the torque restoration control to converge, erroneous learning can be prevented.

Further, during the inertia phase, variation in the engine rotation speed and turbine rotation speed increases and decreases due to variation in the command oil pressure for the lockup clutch and so on, leading to variation in a slip rotation speed. By not performing learning during the inertia phase in which the slip rotation speed varies in this manner, erroneous learning can be prevented.

It should be noted that here, the final phase of the shift lasts for approximately 0.2 seconds, and therefore the point at which the timer reaches the predetermined value occurs after the end of the final phase (after the upshift is determined to be complete).

In the step S6, the current slip rotation speed and engine torque are obtained. The slip rotation speed is a rotation speed difference between the engine rotation speed and the turbine rotation speed, which is calculated by subtracting the turbine rotation speed from the engine rotation speed.

In a step S7, a next command oil pressure of the lockup clutch LUC is learned. The next command oil pressure is learned on the basis of the slip rotation speed and engine torque obtained in the step S6 by referring to a correction amount map shown in FIG. 7.

FIG. 7 is a correction amount map showing a correction amount of the next command oil pressure at each slip rotation speed and engine torque. Using a slip rotation speed at which the correction amount is zero as a threshold, the correction amount takes a positive value when the slip rotation speed obtained in the step S6 is larger than the threshold and a negative value when the slip rotation speed is smaller than the threshold.

Further, the correction amount is set at a steadily larger value as the slip rotation speed increases beyond the threshold and at a steadily smaller value as the slip rotation speed falls further below the threshold. Moreover, the slip rotation speed at which the correction amount is zero takes a steadily larger value as the engine torque increases, taking into consideration the magnitude of the slip amount corresponding to the engine torque.

For example, in FIG. 7, when the engine torque is 100 and the slip rotation speed is 100, the correction amount is zero, when the slip rotation speed is 50, the correction amount is −10, and when the slip rotation speed is 150, the correction amount is 10.

Further, when the slip rotation speed is 100 and the engine torque is 50, the correction amount is 10, and when the slip rotation speed is 100 and the engine torque is 150, the correction amount is −10.

On the basis of the correction amount set in this manner, the command oil pressure is corrected in an increasing direction when the correction amount takes a positive value and corrected in a decreasing direction when the correction amount takes a negative value.

Figure 8:
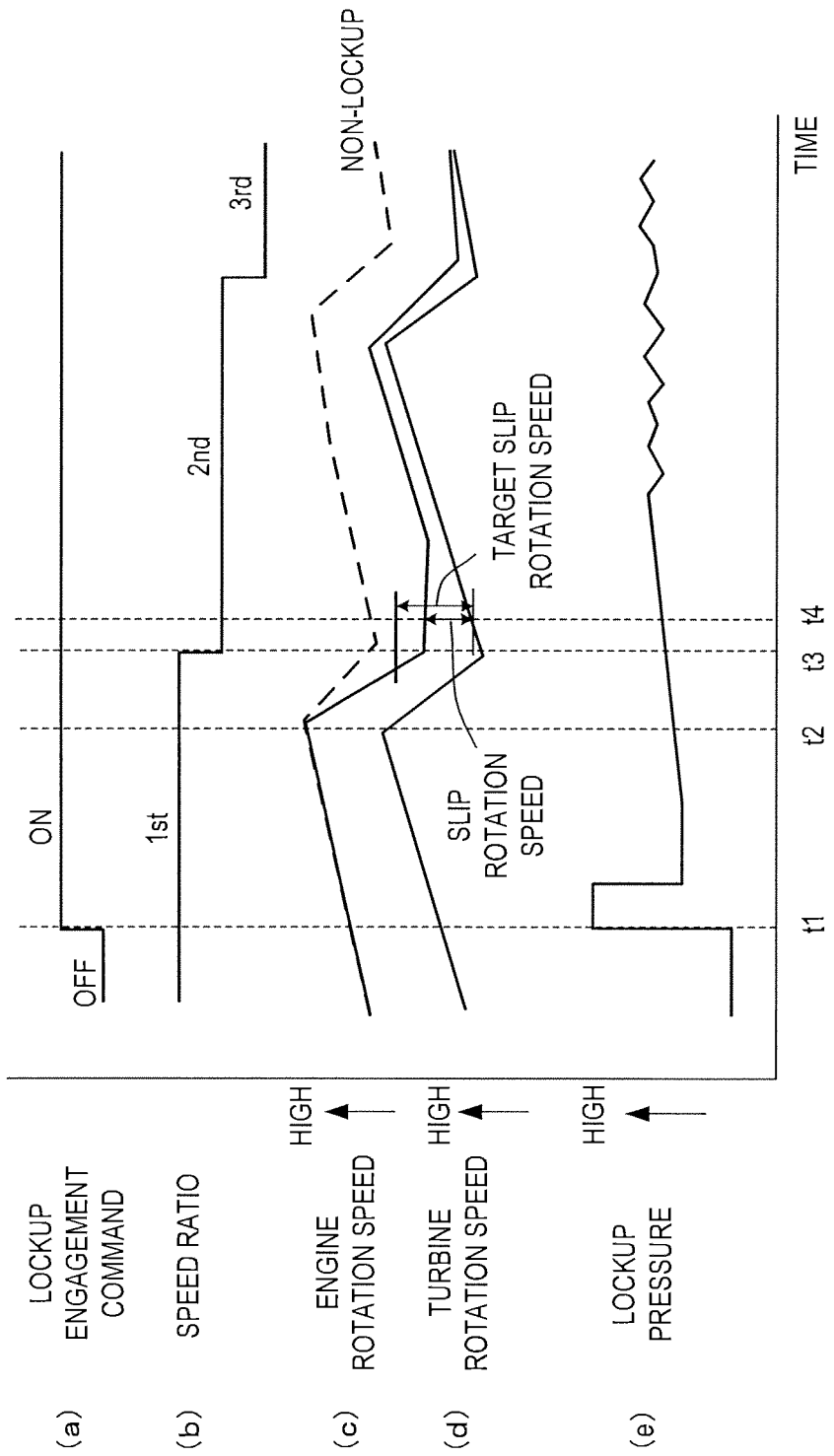
FIG. 8 is a time chart illustrating actions of the control device for the automatic transmission.
Figure 9:
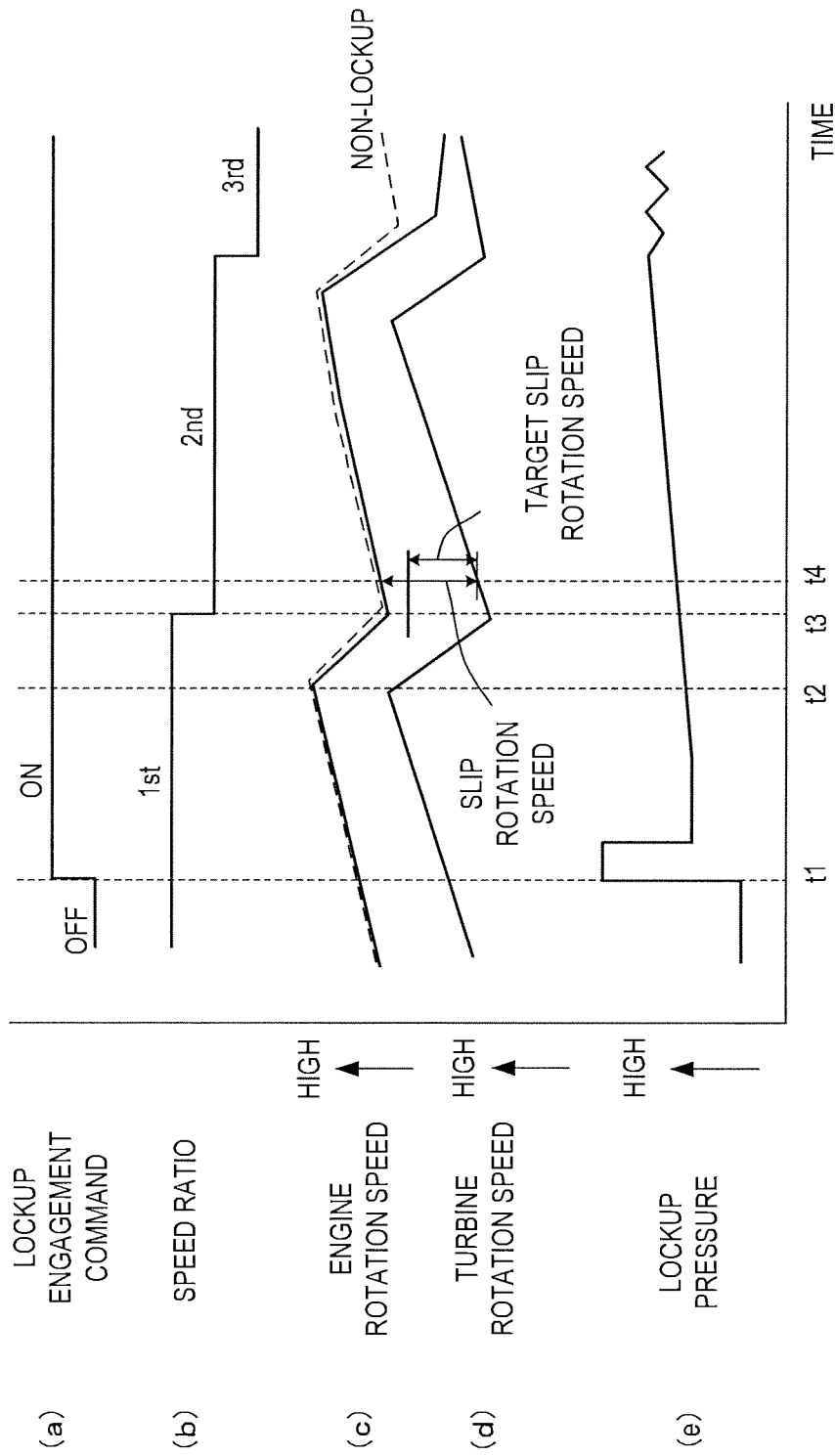
FIG. 9 is a time chart illustrating actions of the control device for the automatic transmission.

Next, referring to FIGS. 8 and 9, actions of the control device for an automatic transmission according to this embodiment will be described. FIG. 8 is a time chart showing variation in a case where the command oil pressure for the lockup clutch LUC is too high, and FIG. 9 is a time chart showing variation in a case where the command oil pressure for the lockup clutch is too low. FIGS. 8 and 9 respectively show (a) the engagement command relating to the lockup clutch, (b) the speed ratio, (c) the engine rotation speed, (d) the turbine rotation speed, and (e) a lockup pressure. Further, a broken line in (c) indicates the engine rotation speed in a converter condition where the lockup clutch is not engaged.

First, a case in which the command oil pressure is too high will be described with reference to FIG. 8. When the operating condition defined by the vehicle speed and the accelerator opening crosses the first speed lockup ON line at a time t1 during travel in the first speed such that an engagement command is output in relation to the lockup clutch LUC, the command oil pressure is increased in stepped fashion and then reduced following the elapse of a predetermined time. The reason for this is to ensure that a piston stroke required to prepare for engagement of the lockup clutch LUC is performed quickly, and at this point, the lockup clutch LUC does not yet possess engagement capacity. The command oil pressure is then gradually increased.

A 1→2 shift command is then output, and when the engine rotation speed and turbine rotation speed begin to decrease at a time t2, the speed ratio decreases such that the inertia phase of the 1→2 shift is determined to have begun. Further, when the speed ratio falls to the speed ratio corresponding to the second speed at a time t3, the inertia phase of the 1→2 shift is determined to be complete.

At a time t4, following the elapse of a predetermined time from the end of the inertia phase, the current slip rotation speed and engine torque are obtained. At this time, the engagement capacity is larger than necessary due to the excessively high command oil pressure for the lockup clutch LUC, and therefore the engine rotation speed falls greatly, causing the slip rotation speed to fall below a target slip rotation speed. Here, the target slip rotation speed is a slip rotation speed in a case where the command oil pressure for the lockup clutch LUC takes an appropriate value.

Accordingly, the command oil pressure correction value, which is found on the basis of the slip rotation speed, is set at a negative value such that the next command oil pressure is corrected in the decreasing direction. Thus, the slip rotation speed of the next lockup clutch engagement operation can be brought closer to the target slip rotation speed.

Next, a case in which the command oil pressure is too low will be described with reference to FIG. 9. Variation up to the time t2 is identical to that of FIG. 8, and therefore the inertia phase of the 1→2 shift is determined to be complete at the time t3.

At the time t4, following the elapse of the predetermined time from the end of the inertia phase, the current slip rotation speed and engine torque are obtained. At this time, the engagement capacity is smaller than necessary due to the excessively low command oil pressure, and therefore the decrease in the engine rotation speed is small, causing the slip rotation speed to exceed the target slip rotation speed.

Accordingly, the command oil pressure correction value found on the basis of the slip rotation speed is set at a positive value such that the next command oil pressure is corrected in the increasing direction. Thus, the slip rotation speed of the next lockup clutch engagement operation can be brought closer to the target slip rotation speed.

Hence, in this embodiment, when the inertia phase of an upshift in the transmission begins during an engagement operation of the lockup clutch LUC, the next command oil pressure is learned on the basis of the slip rotation speed, and therefore, even in a case where a reduction in the engine rotation speed due to engagement of the lockup clutch LUC occurs at the same time as variation in the engine rotation speed due to a shift, the command oil pressure for the lockup clutch LUC can be learned to an appropriate value without being affected by the shift.

Further, the next command oil pressure is corrected in an increasing direction when the slip rotation speed is larger than a predetermined threshold and corrected in a decreasing direction when the slip rotation speed is smaller than the predetermined threshold, and therefore the command oil pressure can be learned to an appropriate value in accordance with excess/deficiency in the oil pressure supplied to the lockup clutch LUC.

Moreover, the predetermined threshold is set to be steadily larger as the engine torque following the start point of the inertia phase of the upshift increases, and therefore the command oil pressure for the lockup clutch LUC can be learned to an appropriate value taking into consideration the magnitude of a slip amount corresponding to the engine torque.

Further, a slip rotation speed at a point following the elapse of a predetermined time from the end of the inertia phase is used as the slip rotation speed, and therefore the effects of deceleration G accompanying the shift, an increase in torque occurring when torque reduction is canceled during the shift, and so on can be suppressed. As a result, the command oil pressure can be learned to an even more appropriate value.

This invention is not limited to the above embodiment and may be subjected to various amendments and modifications within the scope of the technical spirit thereof.

For example, in this embodiment, control executed to learn the command oil pressure of the lockup clutch LUC during first speed lockup was described, but this invention is not limited thereto and may be applied to control for learning the command oil pressure during a lockup operation performed while the vehicle travels in a gear position other than the first speed.

Further, in this embodiment, the command oil pressure is learned on the basis of the slip rotation speed at a point following the elapse of a predetermined time from the end of the inertia phase of a 1→2 shift, but the timing for obtaining the slip rotation speed is not limited to a point following the elapse of a predetermined time from the end of the inertia phase, and the slip rotation speed may be obtained at any other timing after the start of the inertia phase.

Furthermore, in this embodiment, an engine is cited as an example of a driving force source, but this invention is not limited thereto and may be applied to a vehicle having a motor or the like as a driving force source.

This application claims priority based on Japanese Patent Application No. 2009-216752, filed with the Japan Patent Office on Sep. 18, 2009, the entire content of which is incorporated into this specification by reference.

What is claimed is:

1. An automatic transmission comprising:
 a lockup clutch configured to directly couple an input side and an output side of a torque converter between a power source and a transmission, an engagement capacity of the lockup clutch being controlled in accordance with a command oil pressure, and
 a learning unit that, when an inertia phase of an upshift of the transmission is started during a lockup clutch engagement operation, corrects a following command oil pressure to be used during a following lockup clutch engagement operation on a basis of a slip rotation speed, the slip rotation speed being a rotation speed difference between an input side rotation speed of the torque converter and an output side rotation speed of the torque converter, at a start point of the inertia phase or after the start point of the inertia phase.

2. The automatic transmission as defined in claim 1, wherein the learning unit corrects the following command oil pressure in an increasing direction when the slip rotation speed is larger than a predetermined threshold and corrects the following command oil pressure in a decreasing direction when the slip rotation speed is smaller than the predetermined threshold.

3. The automatic transmission as defined in claim 2, wherein the predetermined threshold is set to increase as a torque of the power source at the start point of the inertia phase or after the start point of the inertia phase increases.

4. The automatic transmission as defined in claim 1, wherein the slip rotation speed is a slip rotation speed at a point following an elapse of a predetermined time from completion of the inertia phase.

5. A learning method for an automatic transmission including a lockup clutch configured to directly couple an input side and an output side of a torque converter between a power source and a transmission, comprising:

controlling an engagement capacity of the lockup clutch in accordance with a command oil pressure, and when an inertia phase of an upshift of the transmission is started during a lockup clutch engagement operation, correcting a following command oil pressure to be used during a following lockup clutch engagement operation on a basis of a slip rotation speed, the slip rotation speed being a rotation speed difference between an input side rotation speed of the torque converter and an output side rotation speed of the torque converter, at a start point of the inertia phase or after the start point of the inertia phase.

6. The learning method as defined in claim 5, further comprising:

correcting the following command oil pressure in an increasing direction when the slip rotation speed is larger than a predetermined threshold, and correcting the following command oil pressure in a decreasing direction when the slip rotation speed is smaller than the predetermined threshold.

7. The learning method as defined in claim 6, further comprising:

setting the predetermined threshold to increase as a torque of the power source at the start point of the inertia phase or after the start point of the inertia phase increases.

8. The learning method as defined in claim 5, wherein the slip rotation speed is a slip rotation speed at a point following an elapse of a predetermined time from completion of the inertia phase.

9. An automatic transmission comprising:

a lockup clutch configured to directly couple an input side and an output side of a torque converter between a power source and a transmission, an engagement capacity of the lockup clutch being controlled in accordance with a command oil pressure, and a learning means for, when an inertia phase of an upshift of the transmission is started during a lockup clutch engagement operation, correcting a following command oil pressure to be used during a following lockup clutch engagement operation on a basis of a slip rotation speed, the slip rotation speed being a rotation speed difference between an input side rotation speed of the torque converter and an output side rotation speed of the torque converter, at a start point of the inertia phase or after the start point of the inertia phase.

10. The automatic transmission as defined in claim 9, wherein the learning means corrects the following command oil pressure in an increasing direction when the slip rotation speed is larger than a predetermined threshold and corrects the following command oil pressure in a decreasing direction when the slip rotation speed is smaller than the predetermined threshold.

11. The automatic transmission as defined in claim 10, wherein the predetermined threshold is set to increase as a torque of the power source at the start point of the inertia phase or after the start point of the inertia phase increases.

12. The automatic transmission as defined in claim 9, wherein the slip rotation speed is a slip rotation speed at a point following an elapse of a predetermined time from completion of the inertia phase.

* * * * *